US011965406B2

(12) United States Patent
Antonelli et al.

(10) Patent No.: US 11,965,406 B2
(45) Date of Patent: Apr. 23, 2024

(54) EXCAVATING MACHINE WITH CONTROL SYSTEM OF THE COMBINED DRIVE OF TWO WINCHES

(71) Applicant: SOILMEC S.P.A., Cesena (IT)

(72) Inventors: Alberto Antonelli, Cesena (IT); Alessio Zanichelli, Cesenatico (IT); Luigi Amoruso, Ravenna (IT)

(73) Assignee: SOILMEC S.P.A., Cesena (IT)

( * ) Notice: Subject to any disclaimer, the term of this patent is extended or adjusted under 35 U.S.C. 154(b) by 154 days.

(21) Appl. No.: 17/429,252

(22) PCT Filed: Jan. 21, 2020

(86) PCT No.: PCT/IB2020/050430

§ 371 (c)(1),
(2) Date: Aug. 6, 2021

(87) PCT Pub. No.: WO2020/161551

PCT Pub. Date: Aug. 13, 2020

(65) Prior Publication Data

US 2022/0098967 A1 Mar. 31, 2022

(30) Foreign Application Priority Data

Feb. 7, 2019 (IT) ........................ 102019000001761

(51) Int. Cl.
*E21B 7/02* (2006.01)
*E02F 9/20* (2006.01)
(Continued)

(52) U.S. Cl.
CPC .............. *E21B 44/00* (2013.01); *E21B 7/022* (2013.01); *F15B 15/20* (2013.01); *F15B 19/00* (2013.01);
(Continued)

(58) Field of Classification Search
CPC ......... E02F 9/2016; E02F 9/2058; E02F 9/22; E21B 7/003; E21B 7/005; E21B 7/02;
(Continued)

(56) References Cited

U.S. PATENT DOCUMENTS

2009/0100830 A1* 4/2009 Schneider ............... F15B 7/008 60/484
2013/0075156 A1* 3/2013 Casadei .................. G06F 15/00 702/9
(Continued)

FOREIGN PATENT DOCUMENTS

CN 104295234 A 1/2015
CN 104214150 B 3/2016
(Continued)

OTHER PUBLICATIONS

International Search Report and Written Opinion for PCT/IB2020/050430, dated Mar. 17, 2020.

*Primary Examiner* — Christopher J Sebesta
*Assistant Examiner* — Lamia Quaim

(57) ABSTRACT

An excavating machine includes an actuation unit for moving the excavator, a main winch and secondary winch for lifting and lowering the actuation unit. A closed hydraulic circuit or an electric circuit drives the main winch. An open hydraulic circuit drives the secondary winch. A first pressure or current sensor measures fluid pressure or, electric current intensity in the hydraulic or electric driving circuit. A second pressure sensor measures fluid pressure in the open hydraulic circuit. A pressure regulator regulates fluid pressure in the open hydraulic circuit. A control unit executes a combined operating condition with the winches applying a force simultaneously and based on values sensed, controls the pressure regulator so the fluid pressure in the open hydraulic circuit, during the combined operating condition, has a target value that is a function of: the fluid pressure in the closed hydraulic circuit or the current in the electric circuit.

11 Claims, 5 Drawing Sheets

(51) Int. Cl.
*E21B 10/44* (2006.01)
*E21B 44/00* (2006.01)
*F15B 15/20* (2006.01)
*F15B 19/00* (2006.01)
*E21B 7/00* (2006.01)

(52) U.S. Cl.
CPC ............. *E02F 9/2016* (2013.01); *E21B 7/003* (2013.01); *E21B 7/005* (2013.01); *E21B 7/02* (2013.01); *E21B 7/023* (2013.01); *E21B 10/44* (2013.01)

(58) Field of Classification Search
CPC .......... E21B 7/023; E21B 10/44; E21B 44/00; F15B 15/20; F15B 19/00
See application file for complete search history.

(56) References Cited

U.S. PATENT DOCUMENTS

| | | | | |
|---|---|---|---|---|
| 2017/0204705 | A1* | 7/2017 | King | E21B 44/00 |
| 2018/0251948 | A1* | 9/2018 | Ditillo | E02D 7/18 |

FOREIGN PATENT DOCUMENTS

| | | | |
|---|---|---|---|
| EP | 3372777 | A1 | 9/2018 |
| FR | 2432069 | A1 | 2/1980 |

* cited by examiner

EXCAVATING MACHINE WITH CONTROL SYSTEM OF THE COMBINED DRIVE OF TWO WINCHES

This application is a National Stage Application of International Application No. PCT/I132020/050430, filed Jan. 21, 2020, which claims benefit of Ser. No. 102019000001761, filed Feb. 7, 2019, 2018 in Italy and which applications are incorporated herein by reference. To the extent appropriate, a claim of priority is made to each of the above-disclosed applications.

FIELD OF INVENTION

The present invention relates to an excavating machine equipped with a system for controlling two winches for moving the excavating tool, driven by means of different circuit types. The invention further relates to a method for controlling said winches.

BACKGROUND ART

In the field of drilling for making large-diameter piles, a number of technologies exist which may require the simultaneous use of multiple winches in order to extract the drill string or, more in general, the excavating tool, from the soil. The most common one of such technologies is continuous flight auger (CFA) drilling. This technique offers good performance when small-to-medium diameter excavations need to be made in cohesive soil, and also in loose soil with high probability of collapsing into the hole being drilled. A rotary table located under the guides of a vertical mast rotates and pushes into the hole an auger having a length similar to that of the mast. Depths normally do not exceed 35 metres, because the length of the auger is proportional to that of the mast, and this implies increased machine dimensions resulting in high transportation complexity and costs. It is also necessary to consider that, once the auger has been driven into the soil, the extraction pull necessary for lifting the auger full of earth is proportional to the length of the auger itself and may require the use of a multi-tackle pulling system. The auger, which is equipped with teeth in its lower part, makes the excavation, supports the walls of the borehole being drilled, and expels the debris, the upward flow of the latter along the inclined plane of the auger being facilitated by the rotary motion and helicoid profile of the same.

As it moves up, the auger is often full of damp clays, which are so compact as to hide the auger coils from view; such clays considerably increase the overall weight of the drill string. When the excavation is complete, the auger ensures the supply of cement mixture, which is pumped through the hollow core of the auger itself. The mixture, usually concrete, exits through the tip and fills up the space that is left available by the auger as it is pulled up.

For the purpose of providing the machine with sufficient extraction force, so that it can lift the auger string full of cohesive debris, it is known to use multiple winches in combination, usually two, both acting upon the slidable rotary table.

The drilling machines employed in the foundation field, which make use of technologies like the one described above, may be set up with, for example, three winches. The first winch, called main winch, is typically mounted on the upper structure of the machine, and is connected to the drill string or to the rotary head by means of a rope. It is usually employed for the movements necessary for lowering and extracting the drill string. A second winch, called pull-down winch, may be mounted either on the upper structure of the machine or directly on the mast, and is connected, by means of a suitable path of ropes, to the guiding carriage of the rotary head, also known simply as rotary. Through the pull-down winch, therefore, one can control the up and down movements of the rotary relative to the mast, while applying a thrust force, and possibly also an extraction force, to the drill string.

An optional third winch, called auxiliary winch, is used for handling the elements of the drill string and for lifting other objects, such as any accessories that may be required during the drilling operations.

Drilling machines in CFA (continuous flight auger) configuration, wherein ropes are used for controlling the up and down movements of the rotary carriage, the ropes of the main winch and of the second (pull-down) winch are both connected to either the carriage or the rotary. Usually the pull-down winch draws the carriage by means of a system including an upper rope, connected to a first pulley in the upper half of the carriage, and a lower rope, connected to a second pulley in the lower half of the carriage. One end of the lower rope may be fixed to the mast base. Through such a system it is possible to apply an upward or downward pulling force to the rotary carriage, depending on the direction of rotation of the pull-down winch.

The main winch is connected to the rotary carriage by means of a rope and one or more pulleys, usually positioned in the upper part of the carriage or of the rotary itself.

During the drilling operations, the auger string advances under its own weight and is usually retained by the main winch to avoid that the coils might get "screwed" into the soil. It is provided that the advance obtained at each turn of the auger is less than the pitch between one coil and the next.

At this stage, the rope of the main winch is released; therefore, it does not intervene during the descent of the auger string.

On the contrary, during the extraction phase the main winch is actuated and, if the force required for extracting the entire string containing the drilling debris is very high, the second (pull-down) winch may also be used at the same time in order to increase the total extraction force of the machine. This solution is typical of CFA machines configured with the main winch connected to the rotary by means of a rope running on multiple pulleys to exert a double-tackle pull, i.e. to obtain a multiplication of the pulling force exertable by the winch.

In the case wherein both the main winch and the pull-down winch are used in order to extract the string of drilling augers, a so-called combined pull is exerted on said drill string. In this phase it is essential that the two winches are synchronized with each other, so that the ropes will have the same speed and only slightly different pulling forces; otherwise, one winch would be drawing the other, instead of being assisted in the extraction operation.

Moreover, the absence of synchronism between the two winches may result, over time, in damage to mechanical components and to the ropes themselves.

In addition to being used for lifting the auger string when implementing said CFA technology, the combined pull can also be used in other drilling technologies using very heavy and long drill strings for single-pass drilling. Single pass refers to making the entire excavation with a single tool lowering manoeuvre, followed by a single lifting manoeuvre once the final excavation depth has been reached. This is the case, for example, of the cased continuous auger used in technologies such as CSP (cased secant pile) or CAP (cased augered pile), which are similar to CFA but include a casing pipe concentrical to the auger string.

Also in other technologies, such as turbojet, which consists of mechanically mixing the soil in a single pass, with injection of cement under pressure, or the displacement pile technology, it is possible to resort to the synchronized use of both the main and pull-down winches in order to extract the drill string.

In the prior art, both the main winch and the second winch (generally the pull-down one) are typically driven by means of one same type of hydraulic transmission, generally of the open circuit type.

Since the use of the main winch is anyway preponderant over the use of the pull-down winch, and due to the different working cycles and power ratings employed, it is common to use a dedicated hydraulic pump for driving the main winch via an open circuit, whereas the pull-down winch is driven by at least one non-dedicated pump via an open circuit. Such non-dedicated pumps can supply hydraulic power to other devices of the machine when the pull-down winch is not in use.

With this solution, synchronization of the two winches can usually be obtained by simply putting the two open circuits that control the winches in communication with each other.

It is known that a machine in CFA configuration can be easily converted for using drill strings of different types, e.g. strings of telescopic pipes to implement other drilling technologies. In light of the multifunctionality of the above-described machine equipped with two winches, during the various working phases of the machine such winches are generally used according to different working cycles. For this reason, it actually turns out to be advantageous to drive the different winches by means of different types of hydraulic transmission, each one being most appropriate for the working cycle and typology of a particular winch.

SUMMARY OF THE INVENTION

In the present invention, a first winch of the machine, referred to as main winch, is driven by a closed-circuit hydraulic transmission or an electric circuit, while a second winch of the machine, referred to as secondary winch or pull-down winch, is driven by an open-circuit hydraulic transmission.

A machine equipped with winches driven by dedicated circuits of different types is more efficient in terms of energy consumption and provides better control over the different winches.

The invention advantageously allows controlling in a synchronized manner, during the working phases that require a combined pull, the two winches driven by technologically different circuits.

According to the present invention, this and other objects are achieved through a machine and a method of using said machine.

It is understood that the appended claims are an integral part of the technical teachings provided in the following detailed description of the present invention. In particular, the appended dependent claims define some preferred embodiments of the present invention that include some optional technical features.

LIST OF THE DRAWINGS

Further features and advantages of the present invention will become apparent in light of the following detailed description, provided merely as a non-limiting example and referring to the annexed drawings.

DETAILED DESCRIPTION

Figure 1A:
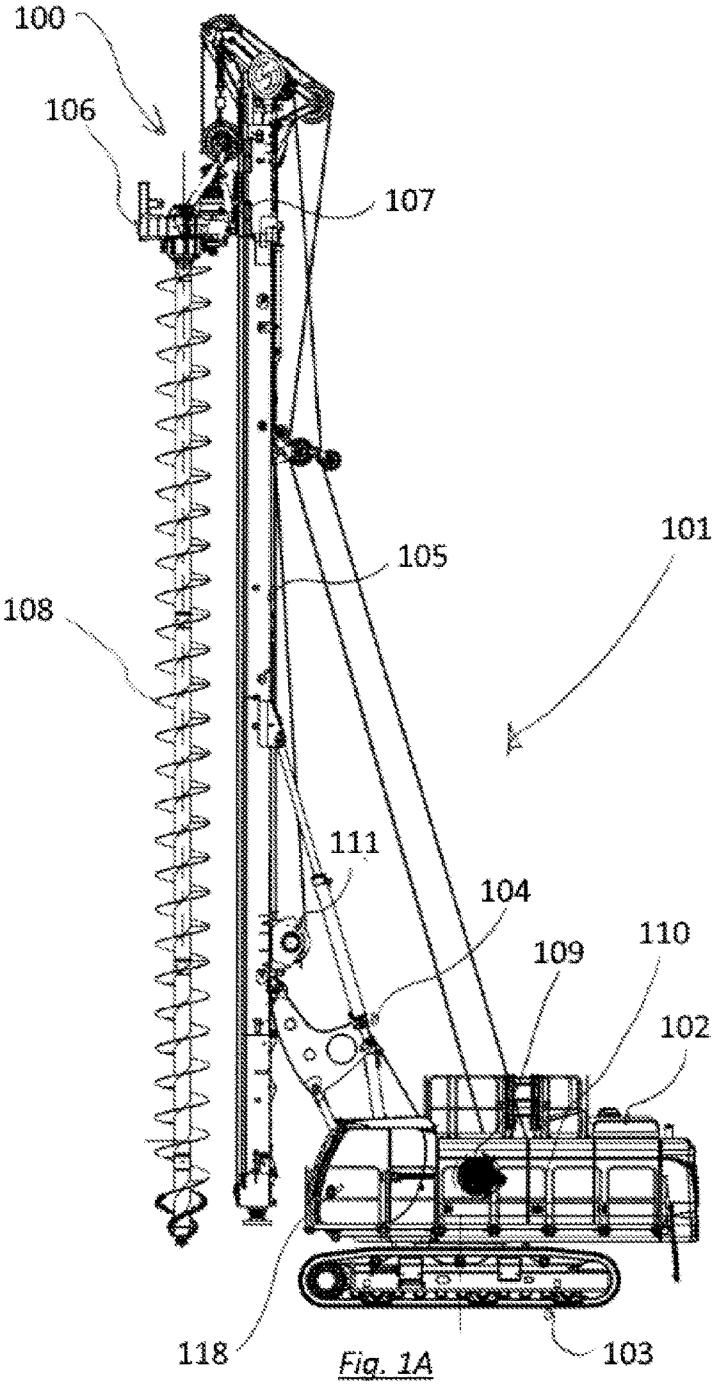
FIG. 1A shows a side view of an excavating machine according to one embodiment of the invention.

FIG. 1A shows a general view of a first embodiment of an excavating machine 101 equipped with the control system for combined winch drive according to the present invention. The machine is provided with excavating means 108, which in the example consist of a string of augers for the CFA drilling technology. The description that follows is also applicable to any other machine equipped with drilling technologies other than CFA (in particular, for "single-pass" drilling), such as, for example, displaced pile, mechanical mixing with injection of cement under pressure, also referred to as "turbojet", cased continuous auger, and other similar technologies using two winches in combined mode during some working phases.

The machine comprises a mast 105. Actuation unit 100 comprises a carriage 107 slidably mounted on mast 105, and a drilling head 106 connected to carriage 107 and adapted to rotatably move excavating means 108. The machine illustrated herein is a drilling machine, and secondary winch 111 is a pull-down winch.

Drilling machine 101 illustrated herein is equipped with an upper structure 102, which is conveniently rotatable, in particular located on top of an undercarriage 103. A mast 105 is connected to swivelling upper structure 102 by means of a kinematic linkage 104, and along the mast an actuation unit 100 can slide, which comprises a rotary head 106, also referred to as "rotary", and a guiding carriage 107. Guiding carriage 107 allows rotary 106 to slide along mast 105. Actuation unit 100 causes excavating means 108 connected thereto to make a rotational and translational movement, which in the example results in the auger string being driven into the underlying soil.

A main winch 109 and a secondary winch 111 are housed on upper structure 102.

The invention concerns an excavating machine 101, in particular a drilling machine, comprising:

- an actuation unit 100 for moving excavating means 108;
- a main winch 109 connected, through a main rope 113, to actuation unit 100, for lifting and lowering said actuation unit 100;
- a secondary winch 111 connected, through at least one secondary rope 114, 115, to actuation unit 100, for lifting and lowering said actuation unit 100;
- a primary driving circuit, which is a closed hydraulic circuit 201 or an electric circuit, for driving main winch 109;

an open hydraulic circuit 202 for driving secondary winch 111;

a first pressure sensor 213 or a current sensor, associated with the primary driving circuit, for measuring pressure Pprinc of a fluid or, respectively, the intensity of an electric current, adapted to circulate in said primary driving circuit for driving main winch 109;

a second pressure sensor 216 associated with open hydraulic circuit 202, for measuring pressure Ppd of a fluid adapted to circulate in said open hydraulic circuit 202 for driving secondary winch 111;

pressure regulating means for regulating pressure Ppd of the fluid in open hydraulic circuit 202;

a control unit 118 configured for:

executing a combined operating condition, wherein main winch 109 and secondary winch 111 apply a force simultaneously in order to lift said actuation unit 100;

receiving signals related to values sensed by the first pressure sensor 213 and the second pressure sensor 216, or by the second pressure sensor 216 and the current sensor; and, based on such values, controlling the pressure regulating means in a manner such that pressure Ppd of the fluid in open hydraulic circuit 202, during the combined operating condition, takes a target value Ptarget that is a function of: pressure Pprinc of the fluid in closed hydraulic circuit 201 or, respectively, the electric current in the electric circuit.

The fluid circulating in hydraulic circuits 201, 202 is conveniently a liquid, preferably oil.

Figure 1B:
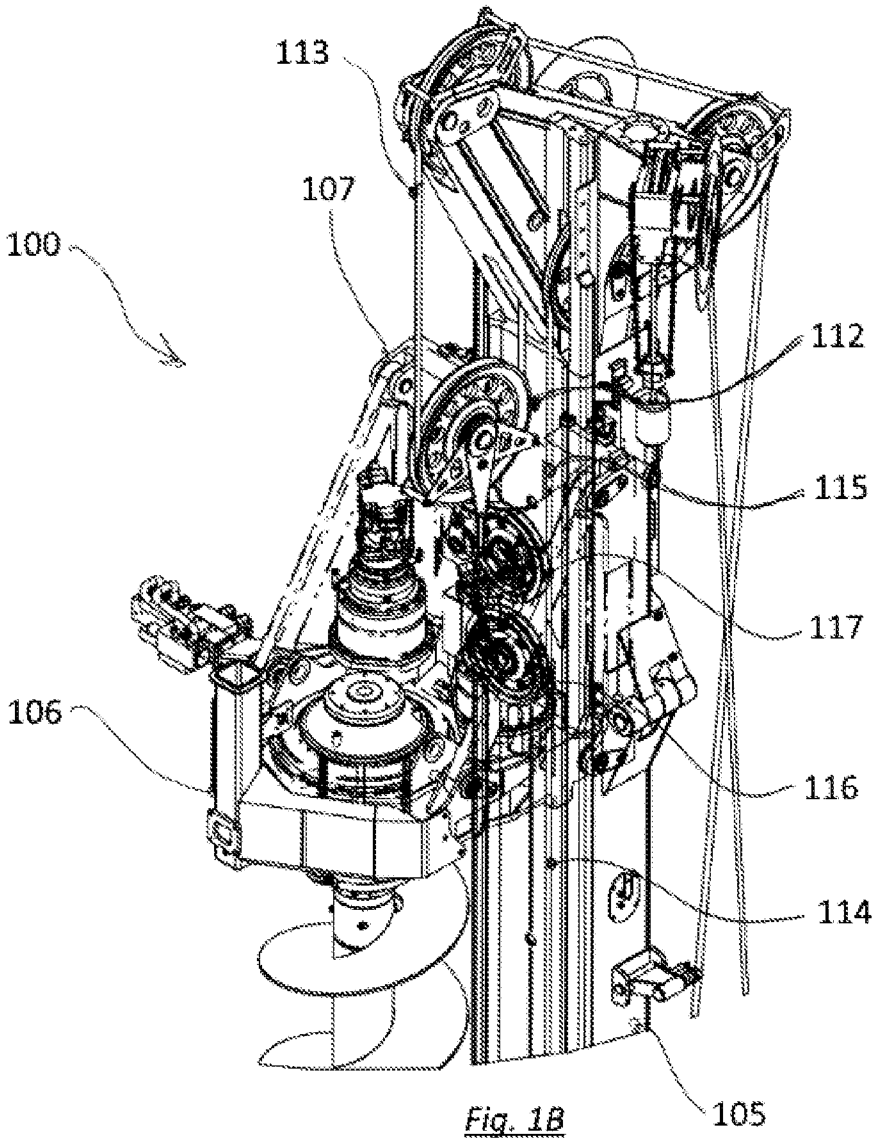
FIG. 1B shows a detailed view of the actuation unit and of the ropes of the winches connected thereto.

As shown in FIG. 1B, rope 113 of main winch 109 is connected through a pulley 112 to the upper part of rotary 106.

On mast 105 there is secondary winch 111, in particular a pull-down winch, which causes guiding carriage 107 to slide by means of two secondary ropes 114 and 115. The first rope 114 is connected to the lower end of guiding carriage 107 by means of a pulley 116, whereas the second rope 115 is connected to the upper end of guiding carriage 107 by means of another pulley 117. In this manner, when lifting guiding carriage 107, the ascending vertical movement is ensured by the pulling action exerted by the second rope 115. Conversely, in order to obtain a downward vertical translation movement, the pulling action exerted by the first rope 114 ensures the descent of guiding carriage 107, and hence of rotary 106 and of excavating means 108, which in the example include a drill string.

During the excavating phase, as excavating means 108 go down, main winch 109 cannot exert any downward force on actuation unit 100. Should it be necessary to apply an additional downward force complementing the effect of the unit's own weight, it will be exerted by actuating secondary winch 111 alone.

When moving back up at the end of the excavation process, the driving of actuation unit 100 is entrusted to both main winch 109 and secondary winch 111. In particular, in order to be able to extract entire excavating means 108 full of debris (in the example, the auger string), main winch 109 is supported by the simultaneous actuation of secondary winch 111, thus accomplishing the combined operating condition (also referred to as combined pull mode).

Excavating machine 101, in particular upper structure 102, comprises control unit 118, which is usually an electronic processing unit such as, for example, a PLC or an industrial PC, which controls all the functions of the machine, including said combined operating condition. Control unit 118 is preferably operationally connected to an interface, e.g. a display, through which an operator can obtain information about machine 101 and, optionally, issue commands or make requests.

Figure 2:
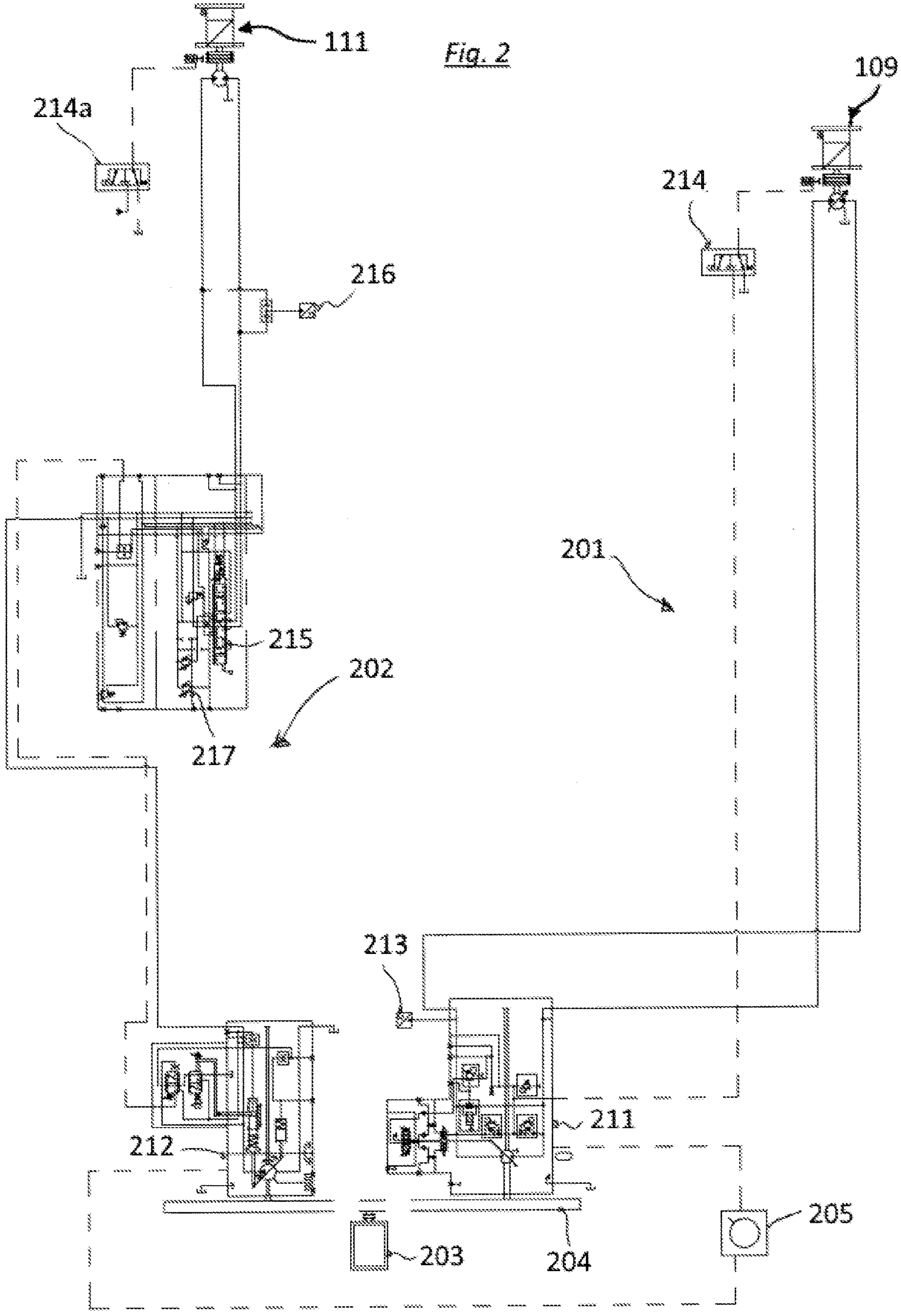
FIG. 2 shows a portion of a simplified hydraulic diagram pertaining to the closed-circuit hydraulic transmission for driving the main winch and the open-circuit hydraulic transmission for driving the secondary winch.

FIG. 2 shows a simplified diagram representative of the driving circuits of the two winches 109, 111. The part on the right depicts closed hydraulic circuit 201 for driving main winch 109, whereas the part on the left illustrates open hydraulic circuit 202 for driving pull-down winch 111.

In the example, both circuits 201, 202 receive power from a first motor 203, which is conveniently an endothermal one or, as an alternative, an electric one, to which two hydraulic pumps 211, 212 are connected. First and second hydraulic pumps 211, 212 are respectively associated with each circuit 201, 202. One or both pumps 211, 212 may conveniently be of the variable displacement type. Optionally, a coupler 204 is interposed between the first motor 203 and hydraulic pumps 211, 212.

According to a preferred variant of the invention, main winch 109 is driven by a closed hydraulic circuit. This solution provides accurate speed control and increased transmission efficiency, and permits doing without a blocking valve (also known as "overcenter" valve) for controlling the winch speed during the descent of the load. By eliminating such valve from the transmission, considerable energy savings are obtained, since no energy needs to be supplied to the drive during the descent phase, which energy would otherwise be dissipated.

Conveniently, secondary winch 111 is hydraulically driven by means of an open circuit. Since it is not used with the same frequency as main winch 109, for reasons of system simplicity and cost the same pump(s) used for driving secondary winch 111 can be employed also for powering other devices not to be used simultaneously, or to be used only partially simultaneously, with it 111.

The activation of the combined operating condition generally occurs following a command issued by a user, in particular on the basis of signals received from a control means 205 operable by a user. Control means 205, e.g. a control device, is preferably adapted to gradually actuate one or both winches 109, 111. Therefore, control means 205 is adapted to send a command, e.g. an electric signal, of variable intensity and user-adjustable. The force or speed of actuation of winches 109, 111 can thus be adjusted. In one embodiment, control means 205 is operationally connected to control unit 118, which controls winches 109, 111. For example, control means 205 (e.g. a joystick) has a movable portion adapted to be manually moved by a user between a stop position, in which winches 109, 111 are not commanded to move, and a maximum actuation position, in which winches 109, 111 are commanded to move at maximum intensity (in particular, speed or force).

The first hydraulic pump 211, which is conveniently of the variable displacement type (preferably with electro-proportional control), upon receiving the command from control means 205, supplies power to closed hydraulic circuit 201 proportionally to the current value sent in accordance with the setting of control means 205. Such control means 205 may be any current regulating device, such as a joystick, or a potentiometer, or a PLC (which may be connected to an interface where the user can enter commands), etc. Therefore, control means 205 is preferably of the proportional type, e.g. electro-proportional. The value of the rate of flow through closed hydraulic circuit 201 is therefore imparted via a linear adjustment of the displacement of pump 211. As a consequence, main winch 109, which is directly connected to the first pump 211, is driven at a speed that is directly proportional to the setting of the first pump 211. Once a given flow rate has been set, the value of the working pressure of the circuit is determined by the weight of the load being hoisted. Such pressure value, designated as Pprinc, is read by pressure sensor 213 and sent to control unit 118.

Conveniently, within closed hydraulic circuit 201 there is a braking valve 214 connected to main winch 109, which ensures that the load will be held in the event of a failure in closed hydraulic circuit 201, or in case of a stop with a suspended load.

The signal supplied by control means 205 is also used for controlling the second pump 212 of the open hydraulic circuit 202. In addition to the second pump 212, there may be other pumps as well, not shown in the drawing, also connected to secondary winch 111 through open connection circuits similar to open hydraulic circuit 202, for the purpose of increasing the total flow rate available at said secondary winch 111, e.g. for high-speed operation. What will be described below in relation to pump 212 shall also apply to any additional pumps and their connection circuits.

Conveniently, open hydraulic circuit 202 comprises a flow regulating valve 215, in particular interposed between the second pump 212 and secondary winch 111, for regulating the flow rate of the fluid flowing towards secondary winch 111.

The second pump 212 is preferably of the load-sensing type, in particular with variable displacement, but it may also be of a different type. The regulation of the second pump 212 is conveniently different from and independent of the regulation of the above-described first pump 211. In accordance with one embodiment, the second pump 212 supplies the maximum flow rate to open hydraulic circuit 202, and then a first adjustment is made, through flow regulating valve 215 interposed between the second pump 212 and secondary winch 111, of the value of the rate of flow arriving at secondary winch 111. The law of regulation of flow regulating valve 215 may be a rising ramp, which may optionally be very steep. It may be provided, for example, that the opening value of flow regulating valve 215 will switch from zero to maximum opening when the setting of control means 205 goes from zero to a value below fifty percent.

Preferably, the pressure regulating means include a pressure regulating valve 217. In the example, with reference to the fluid flow, pressure regulating valve 217 is interposed between the second pump 212 and the second pressure sensor 216. In particular, also flow regulating valve 215 is interposed between such elements 212, 216. As an alternative, if the second pump 212 is a load-sensing one, it will be possible to omit pressure regulating valve 217.

During the synchronized operation of both winches 109, 111, control unit 118 analyzes, at each predefined time interval, the pressure value of open hydraulic circuit 202, designated as Ppd, through a signal received from the second pressure sensor 216. Value Ppd is compared with pressure value Pprinc measured by the first pressure sensor 213. In order to obtain that Ppd is lower than, but as close as possible to, Pprinc, in the preferred embodiment shown herein control unit 118 will adjust the opening of pressure regulating valve 217 of open hydraulic circuit 202 by sending to such valve 217 a signal, e.g. a current signal. The resulting variation in the opening of valve 217 will determine a variation in pressure Ppd measured by the second pressure sensor 216.

Therefore, during the combined operating condition, at predefined time intervals control unit 118 is configured for detecting Ppd, Pprinc (or, respectively, the current in the electric circuit) and for changing the pressure Ppd of the fluid in open hydraulic circuit 202 in order to bring it to target value Ptarget. This is therefore an iterative process. At each cycle, pressure Ptarget will generally be different, and consequently the value of Ppd will vary at each cycle, especially during the initial stage of combined drive of winches 109, 111.

Figure 4:
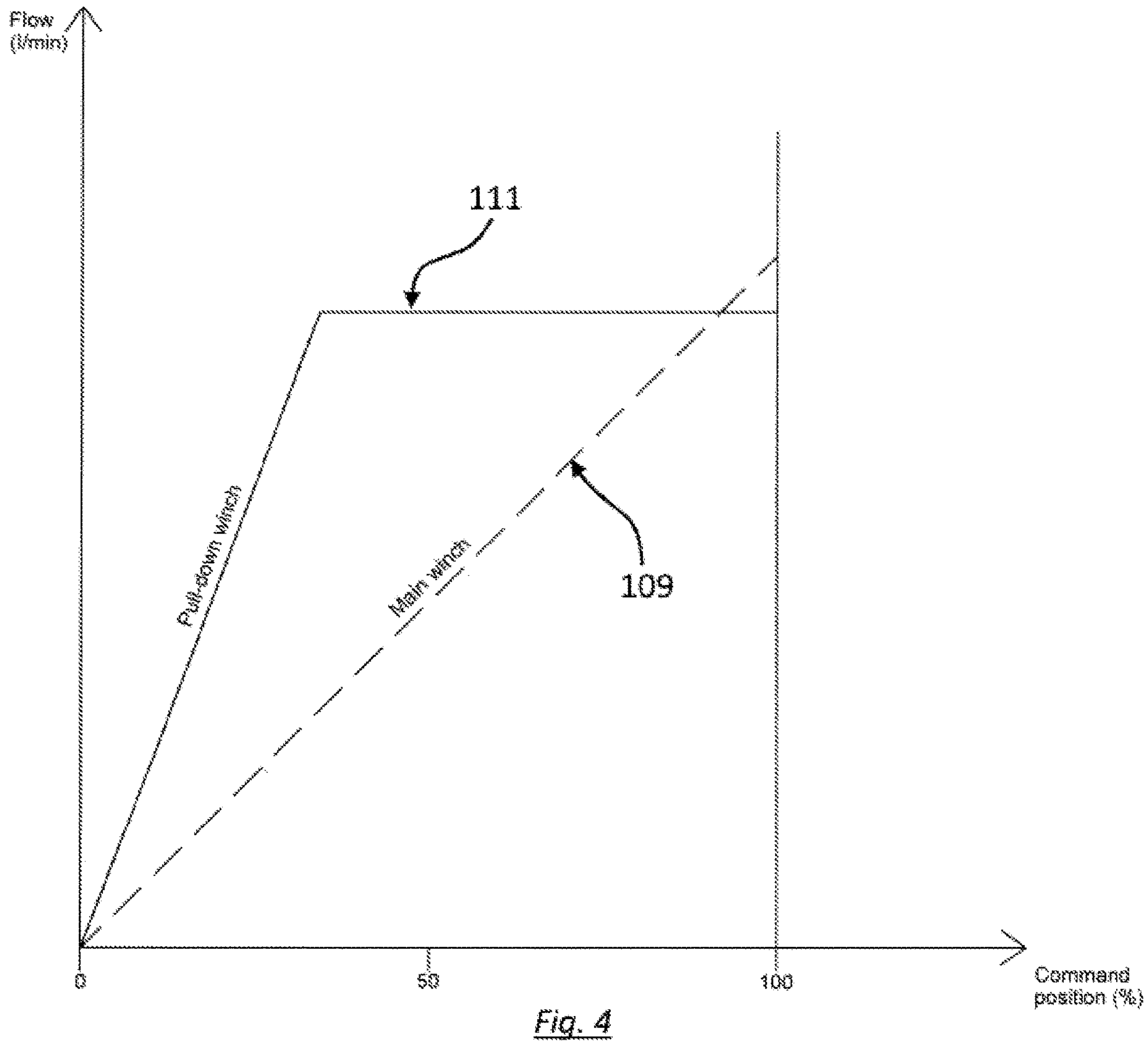
FIG. 4 shows a graph concerning the regulation of the hydraulic flow rate in the circuits for driving the main winch and the secondary winch, as a function of the setting of the control for the combined operating condition, expressed as a percentage from zero to one hundred.

FIG. 4 graphically shows one example of regulation of the flow rates of circuit 201 of the main winch and of circuit 202 of secondary winch 111, as a function of the position of control means 205. As previously described, closed hydraulic circuit 201 and open hydraulic circuit 202 have an independent flow-rate regulation. In particular, it turns out to be advantageous to provide that secondary winch 111 can operate at high speed already with small setting percentages, whereas main winch 109 may have a less rapid speed increase, so as to be more confident that ropes 113, 114, 115 will not get loose. In this case, indicating on the axis of abscissas the value, expressed as a percentage, of the setting of control means 205 from the minimum value 0 to the maximum value 100, and indicating on the axis of ordinates the corresponding flow rate, the flow circulating in closed hydraulic circuit 201 may increase according to a linear law, in a way directly proportional to the setting of control means 205. Such behaviour is indicated in the graph by a dashed straight line. The flow circulating in closed hydraulic circuit 201 is in this example regulated by varying the displacement of the first pump 211 as a function of the position of the control.

In order to obtain a faster behaviour of secondary winch 111 already at an initial control stage, it is for example possible to use, for controlling open hydraulic circuit 201, a ramp that is steeper than a directly proportional response, indicated in the graph by a continuous line. In particular, the machine is configured, e.g. by means of control unit 118, in a manner such that the flow of fluid in open hydraulic circuit 201 will reach the maximum value when control means 205 is set to a drive intensity (e.g. speed or force) lower than the maximum value (corresponding to value 100 in FIG. 4), preferably when control means 205 is set to a drive intensity lower than 50% of the maximum value (corresponding to value 50 in FIG. 4). In the example, such flow rate grows linearly from a null value to the maximum value.

By using, for example, load-sensing second pump 212, so regulated as to deliver the maximum flow rate as soon as a control value is present, flow regulating valve 215 will open progressively according to the position of control means 205, which valve will be closed in position 0 of the control, but could be already fully open, thus allowing circulation of the maximum flow in open hydraulic circuit 202 already with control means 205 set to a position below 50%. In general, through the flow regulating means it is possible to obtain that in open hydraulic circuit 202, when the control value sent by control means 205 is smaller than 50%, the flow rate will reach a maximum value, and that such maximum value will remain substantially constant up to the maximum control value sent by control means 205. In particular, in open hydraulic circuit 202 the flow rate switches from zero to the maximum value in a linear manner (FIG. 4).

Figure 3:
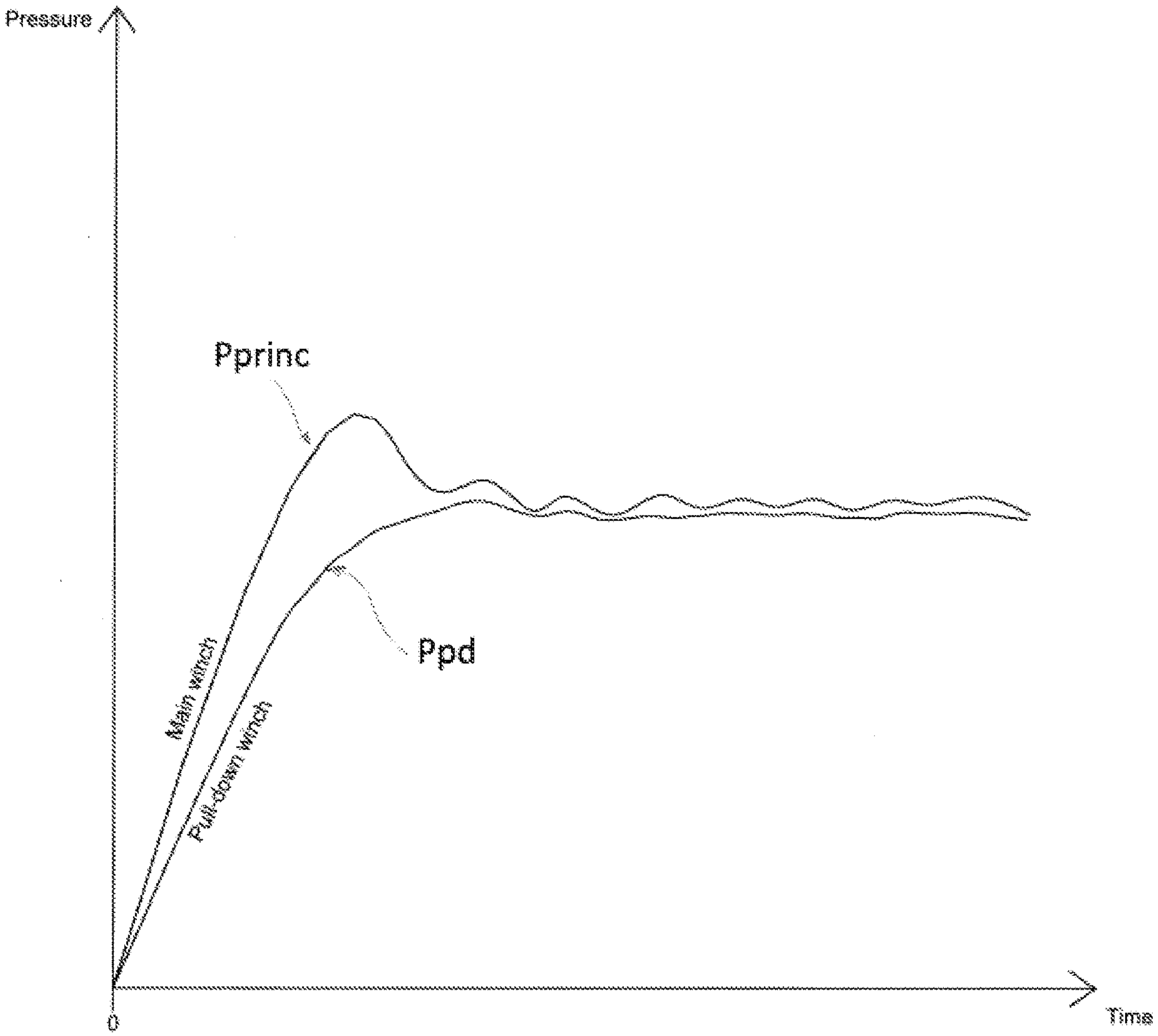
FIG. 3 shows the trend of the pressures in the two circuits for the actuation of the main and secondary winches, during controlled operation in the combined operating condition.

FIG. 3 represents the curve of pressure Pprinc in closed hydraulic circuit 201 for driving main winch 109 and the curve of pressure Ppd in the open hydraulic circuit for driving secondary winch 111 during the combined operating condition of machine 111, wherein the two winches 109, 111 apply a simultaneous, controlled force to actuation unit 100, also referred to as "combined pull". In the graph, the axis of abscissas shows the time of operation in the combined operating condition, and the axis of ordinates shows the pressure. At an initial stage of lifting actuation unit 100, it will be convenient to prevalently operate main winch 109, which is often bigger than secondary winch 111. In such initial transient phase, pressure Pprinc of main winch 109 will increase more rapidly than pressure Ppd of secondary winch 111. It has been experimentally observed that said pressure Pprinc, during the lifting manoeuvre, follows a rising ramp until it reaches a maximum value, and then falls until it stabilizes around a value lower than the maximum value, wherein said stabilization value is dependent on the load to be lifted. For the combined pull system to operate correctly, it should be conveniently provided that pressure Ppd is a function of Pprinc, which can be checked by using formula A, which will be explained below in detail. This is because main winch 109 is usually bigger than secondary winch 111, and it is therefore advantageous that said main winch 109 exerts a greater pulling force on the load, assisted in the lifting operation by secondary winch 111, so as to prevent secondary winch 111 from undergoing excessive stress and avoid instability during the lifting operations. Through closed-loop control over the values of both pressures Ppd and Pprinc, and imposing that Ppd is equal to Ptarget at each control cycle, the value of Ppd will be kept lower than, but close to, Pprinc. The difference between the two pressures Pprinc and Ppd is established by coefficient R, which will be described in detail below.

Preferably, Ppd is always smaller than the value of Pprinc, so as to not lead to instability phenomena in the synchronism between the two winches 109, 111 in the combined operating condition. Such instability phenomena visually reveal themselves as vibrations of guiding carriage 107 and rotary 106, to which winch ropes 113, 114, 115 are connected, and such vibrations are also transferred to the drill string.

Pressure Pprinc at which closed hydraulic circuit 201 instantaneously operates is dependent on the load to be lifted, and is therefore a function of conditions external to the system.

Through closed-loop control using as a reference pressure Pprinc in closed hydraulic circuit 201, the system will provide for adjusting pressure Ppd in open hydraulic circuit 202, via pressure regulating valve 217, as a function of pressure value Pprinc. The two pressures Ppd and Pprinc are preferably correlated with each other in accordance with a function that also takes into account the different geometries and the different mechanical transmission ratios of the two winches 109, 111.

In particular, it may turn out to be advantageous that pressure Ppd of secondary winch 111 is, in a first phase, much lower than pressure Pprinc of main winch 109 (e.g. $Ppd \leq 0.8*Pprinc$), and then grows less rapidly than said pressure Pprinc. After the initial transient, it may instead be convenient to have pressure Ppd reach a value that is still lower than, but very close to, the main winch pressure Pprinc. In general, during the normal operation following an initial transient period, Pprinc and Ppd are substantially equal; for example, $Ppd = Pprinc +/- 5\%$ or 3%.

It may also turn out to be advantageous that the second pump 212 that feeds open hydraulic circuit 202 is of the load-sensing type. In such a case, in fact, the normal displacement, and hence the flow-rate in open hydraulic circuit 202 (which determines the revolution speed of secondary winch 111) will be regulated independently of pressure value Ppd measured in open hydraulic circuit 202. Load-sensing control is based on feedback of measured instantaneous pressure values. Such control acts upon the second pump 212 so as to vary its displacement as a function of detected pressure Ppd. If pressure Ppd increases, the displacement of the second pump 212 will decrease in a way proportional to the pressure increase. As a consequence, the flow delivered by the second pump 212 will decrease as well. Vice versa, a pressure decrease will result in an increase in the displacement of the second pump 212, and hence in increased flow delivered to open hydraulic circuit 212.

Therefore, load-sensing second pump 212 is adapted to keep pressure Ppd of the fluid in open hydraulic circuit 202 at a substantially constant value. The value Ppd is determined at least as a function of the pressure Pprinc. Conveniently, the value of Ppd may change depending on the target pressure value Ptarget, and load-sensing second pump 212 is adapted to maintain such value. Conveniently, control unit 118 is operationally connected to the load-sensing second pump 212 to determine fluid pressure value Ppd that said pump 212 will have to maintain. Therefore, during the combined operating condition, load-sensing second pump 212 is adapted to keep the pressure at value Ptarget. In particular, load-sensing second pump 212 is adapted to measure pressure value Ppd at a point of circuit 202 downstream of load-sensing second pump 212, with reference to the fluid flow.

Conveniently, Ptarget is a function of Pprinc (or Iprinc), Ppd, and the physical and/or geometric characteristics of winches 109, 111. In order to ensure continuous pressure control, the present invention conveniently uses a closed-loop control, through which the measured value of pressure Ppd is compared with a reference pressure value, called Ptarget, which is de facto calculated by means of a function that takes into account the measured value of the pressure of main winch Pprinc, the pressure of secondary winch Ppd, and also a coefficient R indicative of the different physical characteristics of the two winches 109, 111. Such coefficient R, which may be either established in the design phase or determined experimentally, is for convenience expressed in the programming code of control unit 118 as a number variable from 0 to 100. Coefficient R would be 50 if the two winches 109, 111 were identical. In practice, it may be a value close to 50, but slightly higher or lower (e.g., between 40 and 60, or between 45 and 55), depending on the application. Values of R other than 50 may be due, for example, to geometric differences or different transmission ratios between the two winches 109, 111.

Within said function for the calculation of the value Ptarget, the measured value of pressure Pprinc is multiplied by the hundred complement of coefficient R, expressed as a percentage, added to the measured value of pressure Ppd multiplied by coefficient R, expressed as a percentage. The formula, designated as A, will thus be expressed as follows:

$$A: Ptarget = Pprinc \times (100 - R)/100 + Ppd \times R/100$$

The system may make use of tables containing a correlation between the currents imparted by control means 205 to pressure regulating valve 217 and the corresponding value of pressure Ppd. Such tables may be used for finding the current value that will provide a pressure Ppd as close as possible to Ptarget. For example, Ptarget my be compared with the two closest pressure values Ppd in the table, one slightly lower and the other slightly higher than Ptarget. Such values, designated as Pt+1 and Pt−1, will be associated in the table with corresponding current values It+1 and It−1. Through a linearization conveniently executed at each cycle by control unit 118 starting from said pressure and current values, it is possible to calculate current Itarget corresponding to Ptarget at a given instant.

In one variant, the above-described table can be obtained by self-learning of pressure values Ppd corresponding to the incremental current values, by executing a cycle of calibration of secondary winch 111 for multiple current steps, from the minimum current value imparted by control means 205 up to the maximum value, and recording the corresponding pressures.

The invention also concerns a method for controlling an excavating machine, wherein the excavating machine comprises:

an actuation unit 100 for moving excavating means 108;

a main winch 109 connected, through a main rope 113, to actuation unit 100, for lifting and lowering said actuation unit 100;

a secondary winch 111 connected, through at least one secondary rope 114, 115, to actuation unit 100, for lifting and lowering said actuation unit 100;

- a primary driving circuit, which is a closed hydraulic circuit 201 or an electric circuit, for driving main winch 109;
- an open hydraulic circuit 202 for driving secondary winch 111.

The method comprises the steps of:

- measuring pressure Pprinc of a fluid or, respectively, the intensity of an electric current, circulating in said primary driving circuit for driving main winch 109;
- measuring pressure Ppd of a fluid circulating in said open hydraulic circuit 202 for driving secondary winch 111;
- executing a combined operating condition, wherein main winch 109 and secondary winch 111 apply a force simultaneously in order to lift said actuation unit 100;
- based on the sensed values, regulating pressure Ppd of the fluid in open hydraulic circuit 202 in a manner such that, during the combined operating condition, said pressure Ppd takes a target value Ptarget that is a function of: pressure Pprinc of the fluid in closed hydraulic circuit 201 or, respectively, the electric current in the electric circuit.

When open hydraulic circuit 202 is fed by a second pump 212 of the load-sensing type, there is a step of regulating the flow rate of said pump 212.

Preferably, the step of executing a combined operating condition occurs on the basis of commands received from a user, in particular through control means 205.

Preferably, the method is carried out by using machine 101 described and illustrated herein; for simplicity, therefore, its technical features and operating processes will not be repeated.

The present invention implies a number of advantages. By means of a machine equipped with the above-described system it is possible to adjust the speeds and forces of two or more winches operated by transmissions using different technologies (in this example, two different hydraulic circuits) for lifting loads in a combined operating mode, which is especially frequent with some drilling technologies, such as, for example, continuous auger or CFA. In this way, one can exploit the higher efficiency and lower energy consumption ensured by the use of a main winch 109 operating in a closed circuit while keeping secondary winch 111 in an open-circuit condition, thus being able to exploit the second power pump 212 of said secondary winch 111 also for other hydraulic actuators when said secondary winch 111 is not in use.

The following will describe some possible variants of the machine. As previously described, in a construction variant of the machine secondary winch 111 may be driven by more than one pump, each one controlled by an open-circuit hydraulic transmission, so as to have a higher oil flow should it be necessary to operate it at high speed. In such a case, in addition to open hydraulic circuit 202 there may also be other open-circuit sections (not shown in FIG. 2), e.g. a further circuit section equipped with a pump, a flow regulating valve and a pressure regulating valve connected for powering the same secondary winch 111. In the presence of multiple open circuits for driving secondary winch 111, the control logic will remain the same as the one already described. Besides controlling the opening of pressure regulating valve 217, control unit 118 will also control the opening of the second pressure regulating valve, while still imposing the equality of Ppd and Ptarget at each control cycle. The system will in the same manner adjust the opening of the further flow regulating valve, together with valve 215, according to a predefined opening ramp, as a function of the position of control means 205.

According to a further variant, second pump(s) 212 may be of the variable displacement type with electro-proportional control. In such a case, control unit 118 will control such pumps according to a ramp that will allow secondary winch 111 to turn already at high speed when the position of control means 205 is less than fifty percent. In this variant, not shown herein, the at least one flow regulating valve 215 will not be preferred, in that flow control will be effected directly on the at least one second pump 212 of the at least one open hydraulic circuit 202.

In one construction variant, excavating machine 101 may lack a mast 105 and have a tilting arm hinged to upper structure 102. Therefore, the machine comprises a tilting arm, and actuation unit 100 is suspended from the tilting arm through main rope 113 and the at least one secondary rope 114, 115. Main winch 109 is preferably installed on upper structure 102, whereas the secondary winch 111 may be installed either on upper structure 102 or on the tilting arm. The tilting arm conveniently comprises a set of pulleys at its upper end, for returning the ropes of main winch 109 and secondary winch 111. In this case, actuation unit 100 of excavating means 108 is no longer slidable along a mast, but is suspended from the tilting arm (e.g. like a pendulum) and is connected to the ropes of winches 109, 111, which allow it to be lifted or lowered relative to the top of the arm. Also in this variant embodiment it is possible, in the combined operating condition, to lift actuation unit 100 via combined drive of winches 109 and 111. In this construction variant, actuation unit 100 may be a hydromill with actuators for moving excavating tools 108 such as toothed wheels. According to a further construction variant, actuation unit 100 may be a bucket with actuators for moving excavating tools 108 such as valves.

In a further variant, main winch 109 may be, instead of a winch driven by a hydraulic transmission in a closed hydraulic circuit 201, an electrically driven winch, while secondary winch 111 remains a winch driven by a hydraulic transmission in an open hydraulic circuit 202. In other terms, the primary drive circuit is an electric circuit. Therefore, there is a current sensor, associated with the primary drive circuit, for sensing the intensity of an electric current circulating in said electric circuit for driving main winch 109. Control unit 118 is adapted to receive signals pertaining to values detected by the second pressure sensor 216 and by the current sensors and, based on such values, to control the pressure regulating means in a manner such that pressure Ppd of the fluid in open hydraulic circuit 202 will take, during the combined operating condition, target value Ptarget that is a function of the electric current in the electric circuit.

In such a variant, not shown herein, control over the operating speed of main winch 109 may be provided by means of, for example, an inverter connected to control means 205. Based on the position of control means 205, the inverter may, for example, change the working frequency of a motor (e.g. an electric motor), mechanically connected to the drum of main winch 109, so as to vary the revolution speed thereof. Unlike previously described, in this case it will not be possible to detect a pressure value Pprinc dependent on the load being lifted, but it will be possible to measure a current value Iprinc required by the electric motor for lifting the load. In this case, formula A may be rewritten as A':

$$A'\text{:Ptarget'}=\text{Iprinc}\times k\times(100-R)/100+\text{Ppd}\times R/100$$

The logic used for calculating Ptarget will be almost identical to the one expressed by the formula A, the only difference being the introduction of a coefficient k to obtain congruence between electric current and pressure. Once Ptarget' is found, the remaining control logic for the open hydraulic circuit 202 will be same as the one already described.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. An excavating machine, comprising:
- an actuation unit for moving an excavator;
- a main winch connected, through a main line, to the actuation unit, for lifting and lowering said actuation unit;
- a secondary winch connected, through at least one secondary line, to the actuation unit, for lifting and lowering said actuation unit;
- a primary driving circuit, which is a closed hydraulic circuit or an electric circuit, for driving the main winch;
- an open hydraulic circuit for driving the secondary winch;
- a first pressure sensor or a current sensor, associated with the primary driving circuit, for measuring the pressure of a fluid or, respectively, intensity of an electric current, said fluid or said current being adapted to circulate in said primary driving circuit for driving the main winch;
- a second pressure sensor associated with the open hydraulic circuit for measuring pressure of a fluid adapted to circulate in said open hydraulic circuit for driving the secondary winch;
- a pressure regulator for regulating the pressure of the fluid in the open hydraulic circuit;
- a control unit configured for:
  - executing a combined operating condition, wherein the main winch and the secondary winch apply a force simultaneously to lift said actuation unit;
  - receiving signals related to values sensed by the first pressure sensor and the second pressure sensor, or by the second pressure sensor and the current sensor; and, based on the values, controlling the pressure regulator so that the pressure of the fluid in the open hydraulic circuit, during the combined operating condition, takes a target value that is a function of: the pressure of the fluid in the closed hydraulic circuit or, respectively, the electric current in the electric circuit;
- wherein the open hydraulic circuit comprises a second pump for the fluid, and a flow regulating valve interposed between the second pump and the secondary winch for regulating a flow rate of the fluid flowing towards the secondary winch.

2. The machine according to claim 1, wherein the open hydraulic circuit is fed by a load-sensing second pump.

3. The machine according to claim 1, wherein the pressure regulator includes a pressure regulating valve.

4. The machine according to claim 1, comprising a controller adapted to be operated by a user, for adjusting and changing the speed or force of actuation of the main winch and the secondary winch during the combined operating condition.

5. The machine according to claim 1, comprising a tilting arm; wherein the actuation unit is suspended from the tilting arm through the main line and the at least one secondary line.

6. The machine according to claim 1, comprising a joystick for adjusting and changing speed or force of actuation of the main winch and the secondary winch during the combined operating condition.

7. An excavating machine, comprising:
- an actuation unit for moving an excavator;
- a main winch connected. through a main line, to the actuation unit, for lifting and lowering said actuation unit;
- a secondary winch connected, through at least one secondary line, to the actuation unit, for lifting and lowering said actuation unit;
- a primary driving circuit, which is a closed hydraulic circuit or an electric circuit, for driving the main winch;
- an open hydraulic circuit for driving the secondary winch;
- a first pressure sensor or a current sensor, associated with the primary driving circuit, for measuring pressure of a fluid or, respectively, intensity of an electric current, said fluid or said current being adapted to circulate in said primary driving circuit for driving the main winch;
- a second pressure sensor associated with the open hydraulic circuit, for measuring pressure of a fluid adapted to circulate in said open hydraulic circuit for driving the secondary winch:
- a pressure regulator for regulating the pressure of the fluid in the open hydraulic circuit;
- a control unit configured for:
  - executing a combined operating condition, wherein the main winch and the secondary winch apply a force simultaneously to lift said actuation unit:
  - receiving signals related to values sensed by the first pressure sensor and the second pressure sensor, or by the second pressure sensor and the current sensor; and, based on such the values, controlling the pressure regulator so that the pressure of the fluid in the open hydraulic circuit, during the combined operating condition, takes a target value that is a function of: the pressure of the fluid in the closed hydraulic circuit or, respectively, the electric current in the electric circuit and
- a mast;
- wherein the actuation unit comprises a carriage slidably mounted on said mast, and a drill head connected to said carriage and adapted to rotatably move said excavator.

8. An excavating machine, comprising:

an actuation unit for moving an excavator:

a main winch connected, through a main line, to the actuation unit, for lifting and lowering said actuation unit;

a secondary winch connected, through at least one secondary line, to the actuation unit, for lifting and lowering said actuation unit;

a primary driving circuit, which is a closed hydraulic circuit or an electric circuit, for driving the main winch;

an open hydraulic circuit for driving the secondary winch a first pressure sensor or a current sensor, associated with the primary driving circuit for measuring pressure of a fluid or, respectively intensity of an electric current, said fluid or said current being adapted to circulate in said primary driving circuit for driving the main winch;

a second pressure sensor associated with the open hydraulic circuit, for measuring pressure of a fluid adapted to circulate in said open hydraulic circuit for driving the secondary winch:

a pressure regulator for regulating the pressure of the fluid in the open hydraulic circuit;

a control unit configured for:

executing a combined operating condition, wherein the main winch and the secondary winch apply a force simultaneously to lift said actuation unit;

receiving signals related to values sensed by the first pressure sensor and the second pressure sensor, or by the second pressure sensor and the current sensor; and, based on such the values, controlling the pressure regulator so that the pressure of the fluid in the open hydraulic circuit, during the combined operating condition, takes a target value that is a function of: the pressure of the fluid in the closed hydraulic circuit or, respectively, the electric current in the electric circuit:

wherein, at predefined time intervals, the control unit is configured for:

measuring the pressure of the fluid in the open hydraulic circuit, measuring the pressure of the fluid in the closed hydraulic circuit or, respectively, the current in the electric circuit, regulating the pressure of the fluid in the open hydraulic circuit in order to bring the pressure to the target value:

wherein the target pressure value is calculated with one of the following formulae:

$$Ptarget=Pprinc\times(100-R)/100+Ppd\times R/100$$

$$Ptarget=Iprinc\times k\times(100-R)/100+Ppd\times R/100$$

wherein R is a coefficient that is indicative of the different physical characteristics of the main and secondary winches; k is a predetermined coefficient.

9. A method for controlling an excavating machine, wherein the excavating machine comprises:

an actuation unit for moving an excavator;

a main winch connected, through a main line, to the actuation unit, for lifting and lowering said actuation unit;

a secondary winch connected, through at least one secondary line, to the actuation unit, for lifting and lowering said actuation unit;

a primary driving circuit, which is a closed hydraulic circuit or an electric circuit, for driving the main winch;

an open hydraulic circuit for driving the secondary winch;

the method comprises the steps of:

measuring the pressure of a fluid or, respectively, intensity of an electric current, circulating in said primary driving circuit for driving the main winch;

measuring the pressure of a fluid circulating in said open hydraulic circuit for driving the secondary winch;

executing a combined operating condition, wherein the main winch and the secondary winch apply a force simultaneously to lift said actuation unit;

based on sensed values, regulating the pressure of the fluid in the open hydraulic circuit so that, during the combined operating condition, said pressure takes a target value that is a function of: the pressure of the fluid in the closed hydraulic circuit or, respectively, the electric current in the electric circuit;

wherein the following steps are carried out at predefined time intervals:

measuring the pressure of the fluid in the open hydraulic circuit;

measuring the pressure of the fluid in the closed hydraulic circuit or, respectively, the current in the electric circuit:

regulating the pressure of the fluid in the open hydraulic circuit to bring the pressure to the target value; and wherein the target pressure value is calculated with one of the following formulae:

$$Ptarget=Pprinc\times(100-R)/100+Ppd\times R/100$$

$$Ptarget=Iprinc\times k\times(100-R)/100+Ppd\times R/100$$

wherein R is a coefficient that is indicative of physical characteristics of the main winch and the secondary winch; and k is a predetermined coefficient.

10. The method according to claim 9, wherein the open hydraulic circuity fed by a load-sensing second pump and flow rate of said pump is regulated.

11. The method according to claim 9, wherein the step of executing a combined operating condition occurs upon commands received from a user.

* * * * *